United States Patent [19]
Tsutsui

[11] Patent Number: 5,640,204
[45] Date of Patent: Jun. 17, 1997

[54] METHOD AND SYSTEM FOR PROCESSING DOS INFORMATION WITHIN A DIGITAL STILL CAMERA

[75] Inventor: Satoru Tsutsui, Aoba-ku, Japan

[73] Assignee: Ricoh Company, Ltd., Tokyo, Japan

[21] Appl. No.: 633,950

[22] Filed: Apr. 17, 1996

[30] Foreign Application Priority Data

Apr. 18, 1995 [JP] Japan .................................. 7-092596

[51] Int. Cl.$^6$ ...................................................... H04N 5/76
[52] U.S. Cl. .......................................... 348/231; 348/232
[58] Field of Search ................................. 348/222, 231, 348/232, 233; 358/909.1, 906; H04N 5/76, 5/228

[56] References Cited

U.S. PATENT DOCUMENTS

| | | |
|---|---|---|
| 4,531,161 | 7/1985 | Murakoshi . |
| 4,746,993 | 5/1988 | Tada . |
| 5,032,918 | 7/1991 | Ota et al. . |
| 5,034,804 | 7/1991 | Sasaki et al. . |
| 5,062,010 | 10/1991 | Saito . |
| 5,099,262 | 3/1992 | Tanaka et al. . |
| 5,138,459 | 8/1992 | Roberts et al. . |
| 5,146,353 | 9/1992 | Isoguchi et al. . |
| 5,295,077 | 3/1994 | Fukuoka . |
| 5,341,489 | 8/1994 | Heiberger ......................... 348/231 |
| 5,343,243 | 8/1994 | Maeda . |
| 5,367,332 | 11/1994 | Kerns et al. . |
| 5,414,464 | 5/1995 | Sasaki . |
| 5,436,657 | 7/1995 | Fukuoka . |
| 5,526,047 | 6/1996 | Sawanobori ...................... 348/222 |
| 5,528,293 | 6/1996 | Watanabe ........................... 348/231 |

FOREIGN PATENT DOCUMENTS

| | | |
|---|---|---|
| 3-268583 | 11/1991 | Japan . |
| 4-980 | 1/1992 | Japan . |
| 5-167979 | 7/1993 | Japan . |

OTHER PUBLICATIONS

Ricoh Digital Electronic Still (Video) Camera, Instruction Manual for Using DC–1, 9 pages.
Ricoh DC–1, Brochure, May 1995, pp. 1/8–8/8, "Multimedia–Adapted Digital Camera Ricoh DC–1", (with English translation).
Control Technology and Personal Computers, System Design and Implementation, Michael F. Hordeski, pp. 201–202, 1992.

*Primary Examiner*—Sherrie Hsia
*Attorney, Agent, or Firm*—Oblon, Spivak, McClelland, Maier & Neustadt, P.C.

[57] ABSTRACT

A digital camera which captures images and converts the images to a digital form. The digital form of the images is compressed and written into a memory card along with Disk Operating System (DOS) information describing the memory card and files including bios parameters, File Allocation Table (FAT) information, and directory information. When the DOS information within the memory card needs to be changed, the FAT information of the memory card and only a portion of the directory information is read and transferred to a memory within the camera. The directory information which has been loaded into the camera is checked to determine if it is the necessary directory information. If it is not, further directory information is loaded into the memory of the camera. After editing of the FAT and directory information, the edited information is written back into the memory card.

6 Claims, 3 Drawing Sheets

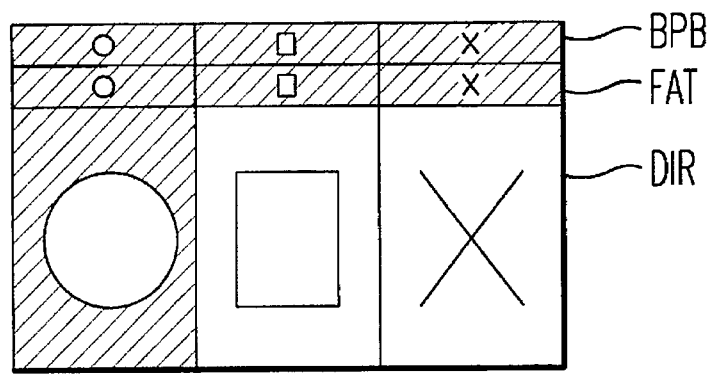
*FIG. 2A*
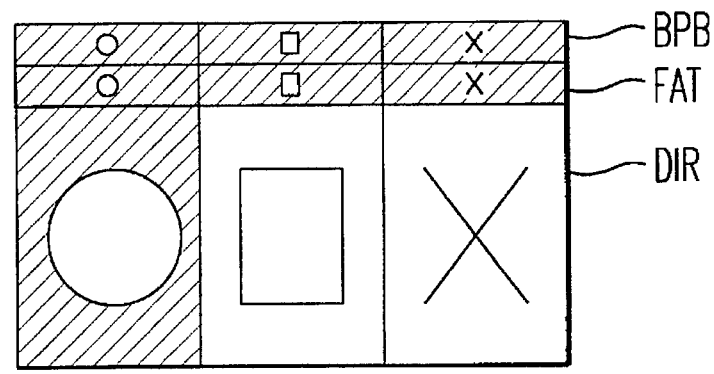
*FIG. 2B(1)*
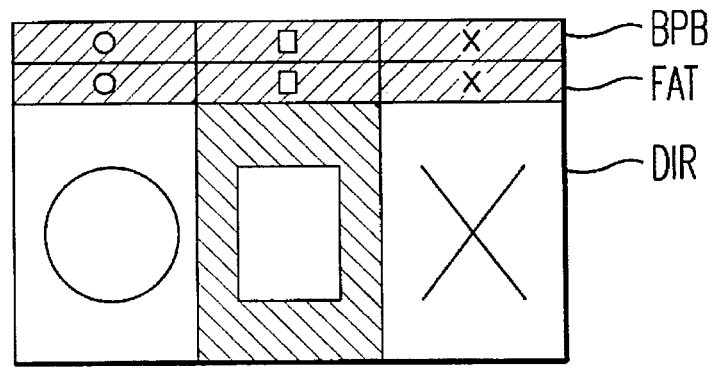
*FIG. 2B(2)*

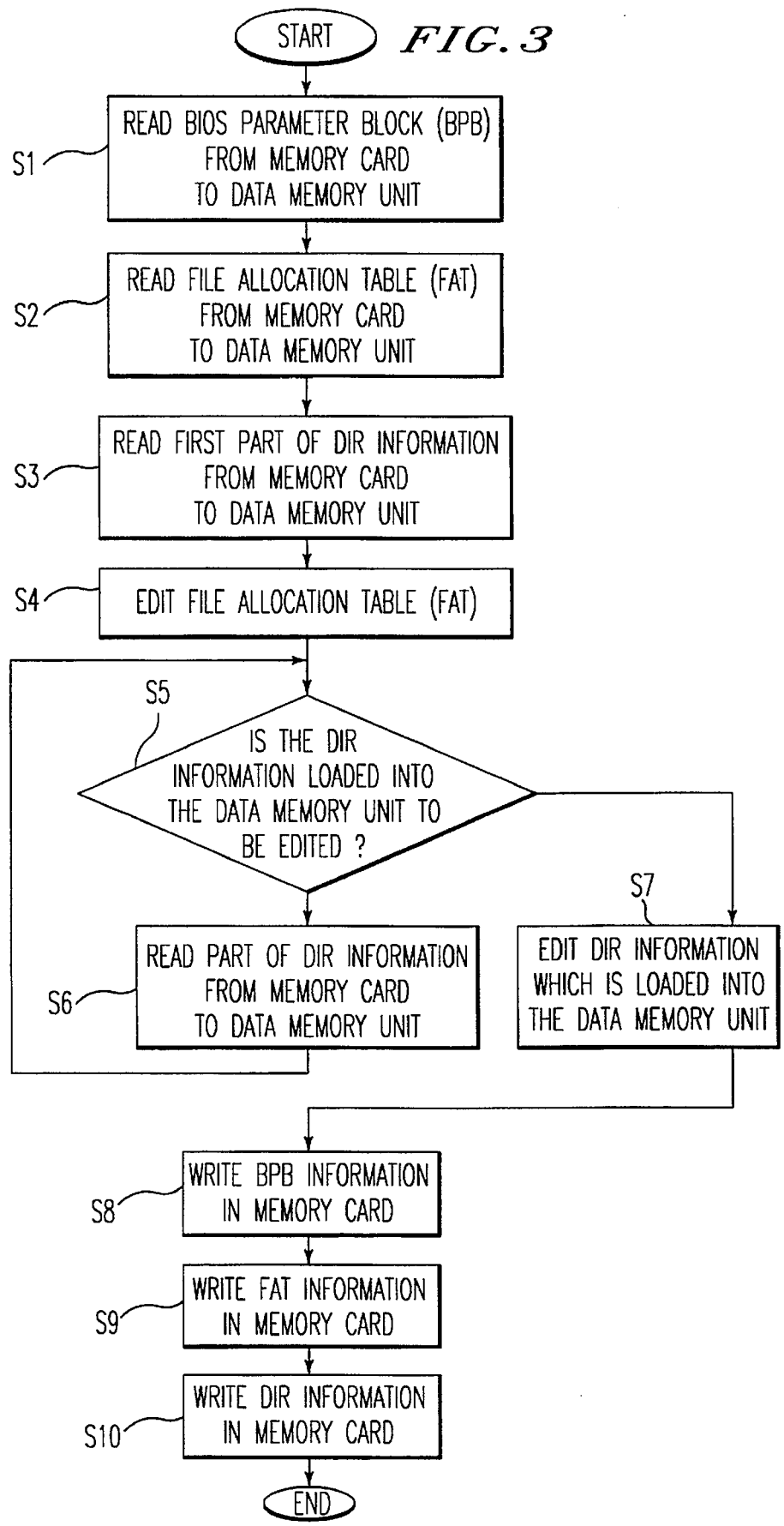

METHOD AND SYSTEM FOR PROCESSING DOS INFORMATION WITHIN A DIGITAL STILL CAMERA

BACKGROUND OF THE INVENTION

1. Field of the Invention

The present invention is directed to a digital electronic still camera in which image data and sound data is recorded on and reproduced from a storage medium.

More particularly, the present invention is directed to a digital still camera which has data memory unit for recording DOS (Disk Operating System) information of image and/or audio files such as information describing a Bios Parameter Block, a file allocation table, and directory information.

The invention is further related to an efficient manner of processing the DOS information using a memory in the camera which has a smaller storage capacity than a memory card which stores the information. The invention is still further related to reading only a portion of directory information from the memory card to the memory of the camera.

2. Discussion of the Background

A digital still camera records image data and sound data on a storage medium such as a memory card and reproduces the images and sound from the storage medium. The image data and sound data is recorded on the storage medium which is formatted using an MS-DOS (Microsoft Disk Operating System) format, for example. The image data and sound data are stored and accessed using MS-DOS including DOS information such as information relating to a Bios Parameter block (BPB), a file allocation table (FAT), and a directory (DIR). Similarly, in a conventional personal computer, data stored using MS-DOS information is commonly utilized.

When MS-DOS information which is recorded on the storage medium in MS-DOS format is edited, the MS-DOS information is read out from the storage medium and is written in a data memory unit, also referred to as a data memory, installed in the personal computer. The MS-DOS information is edited in the data memory unit and is subsequently written in the storage medium.

If the storage medium with information stored using MS-DOS format has large memory capacity, the amount of MS-DOS information on the storage medium is increased. When a large amount of MS-DOS information is edited or changed, a large data memory is necessary. For instance, if the storage medium has a 12 MB capacity, the data memory for MS-DOS information is 64 KB. If the storage medium has a 24 MB capacity, the data memory for MS-DOS information is 128 KB.

However, the present inventor has determined that digital still cameras should have a compact design for ease of portability. A large data memory cannot be installed in the digital still camera in comparison with the personal computer. If a large data memory is installed in the digital still camera, the production cost for the digital still camera is also increased because the large data memory is expensive.

SUMMARY OF THE INVENTION

Accordingly, an object of the present invention is to provide a novel digital still camera which can solve the aforementioned drawbacks. A further object of the present invention is to provide a digital still camera in which a large data memory is not required to be installed so as to make the digital still camera compact and inexpensive.

In order to achieve the above mentioned objects, the present invention provides a novel digital still camera which allows for easy editing of DOS information describing files which store images and/or audio. The camera uses a small memory therein as a temporary storage memory for editing the DOS information. The digital still camera according to the present invention includes an image photographing unit such as a CCD, a data converting unit which converts the input images from an analog form to a digital form, a compress encode/decompress decode unit which encodes the digital image, a memory controller, and two memory devices. One of the memory devices is a memory card such as a removable PCMCIA flash memory card which is used to store images in files and also stores information describing the files, called Disk Operating System (DOS) information including information describing parameters of the memory card, called a Bios Parameter Block (BPB), File Allocation Table (FAT), and directory information. The second memory device, also referred to as a data memory unit, is permanently mounted within the camera and used as a temporary memory for editing the DOS information. The data memory unit is preferably a flash memory or an SRAM. The size of the memory card is preferably from 2–24 megabytes and the size of the data memory unit within the camera is preferably 32 kbytes.

When the DOS information is edited, the BPB information, the FAT information, and only a first portion of the directory information is read from the memory card into the second memory. A check is performed to determine if the directory information which has been read and transferred to the second memory contains the desired directory information. If it does not, a next portion of the directory information from the memory card is read and written into the second memory over the previously stored directory information contained within the second memory. A check is again performed to determine if the desired directory information is contained within the second memory and this process is performed until the desired directory information is loaded into the second memory. The directory information and FAT information is then changed as necessary and after it is changed, it is written back into the memory card for storage. The editing of the DOS information is performed whenever images and/or sound files are created or deleted. Further, the invention may be utilized when the image and/or sound files are edited.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2A, 2B(1) and 2B(2) illustrate how DOS information is read and loaded from a storage medium to a data memory within the camera in order to perform an editing of the DOS information, the hatching indicating the data from the storage medium which is loaded into the data memory; and FIG. 3 is a flowchart showing a process for editing DOS information.

DESCRIPTION OF THE PREFERRED EMBODIMENTS

Figure 1:
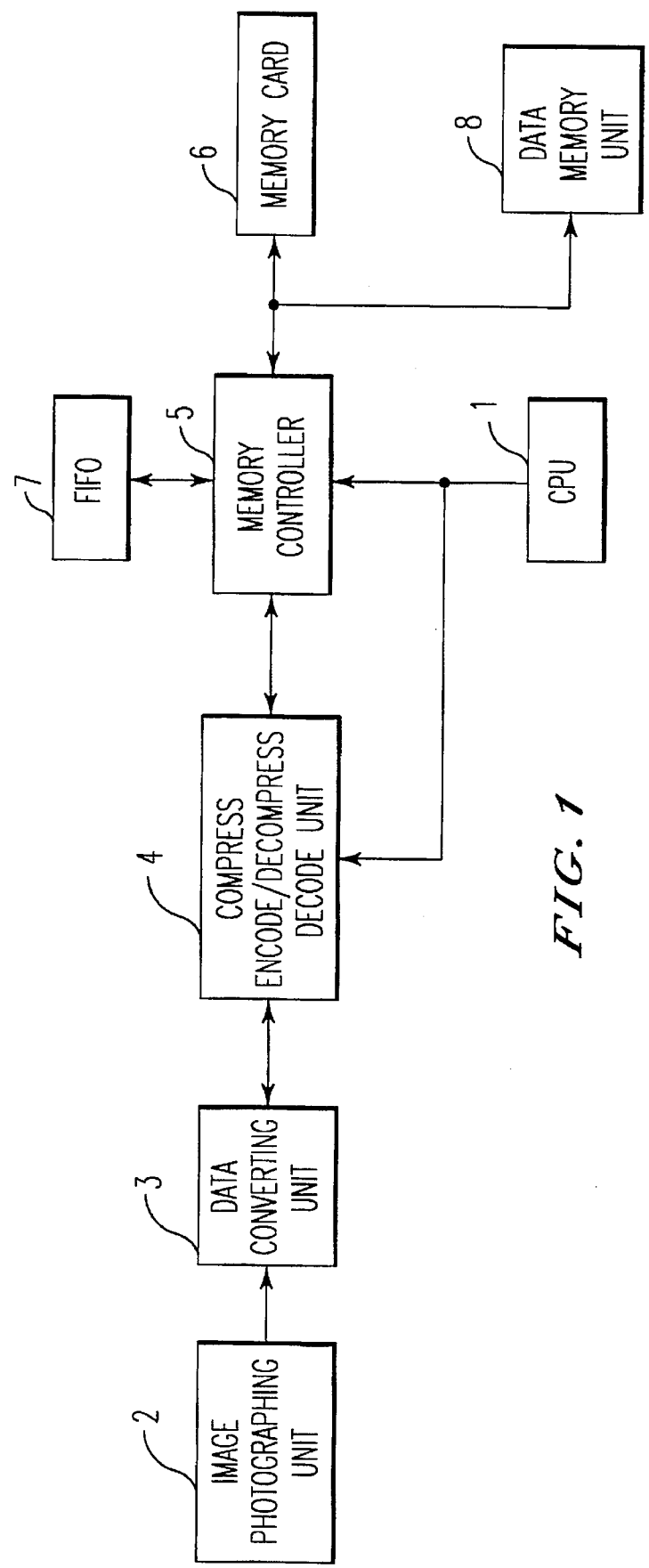
FIG. 1 is a block diagram showing the basic structure of a digital still camera in accordance with the present invention.

A preferred embodiment of a digital still camera in accordance with the present invention will now be explained with reference to accompanying drawings.

FIG. 1 is a block diagram showing an overall structure of a digital still camera, also referred to as a digital camera, in accordance with the present invention. As illustrated in FIG. 1, the digital still camera is provided with a CPU (Central Processing Unit) 1 which functions as a control unit, an image photographing unit 2, a data converting unit 3, a compress encode/decompress decode unit 4, a memory controller 5 which functions as an interface, a memory card 6 which is a storage medium, a FIFO (First In First Out) circuit 7, and a data memory unit 8.

The CPU 1 controls operations of the components of the digital still camera. The image photographing unit 2 which is implemented as a charge coupled device (CCD) converts an image which is detected into analog signals. The data converting unit 3 converts the analog signals into digital signals which represent the image data. The compress encode/decompress decode unit 4 compresses and encodes (and decompresses/decodes) the image data using Huffman coding.

The image data is written into the memory card 6 through the FIFO circuit 7 by operation of the memory controller 5. The memory card 6 is preferably a standard flash memory PC card or other nonvolatile memory which is detachably connected to the camera, although other types of memory devices may be utilized. The memory card is preferably constructed in accordance with the PCMCIA standard and is 2–24 megabytes in size. The image data is read out from the memory card 6 through the FIFO circuit 7 by operation of the memory controller 5.

The compress encode/decompress decode unit 4 decodes and decompresses the previously stored and compressed image data. The data converting unit 3 converts digital signals representing an image into analog signals which are outputted as NTSC video signals to an image display device.

The data memory unit 8 is a working memory of the camera and can be used in the management of tasks of the camera. When an image and/or sound file is created, deleted, or edited, information describing the file (DOS information) is read from the memory card 6 and stored in the data memory unit 8 where it is altered as necessary. The data memory unit 8 is preferably implemented as an SRAM or flash memory and is preferably 32 kbytes in size.

FIGS. 2A, 2B(1) and 2B(2) are diagrams showing a part of the process for editing MS-DOS information in the storage medium of the memory card 6. In FIGS. 2A, 2B(1), and 2B(2), DOS information for three images is illustrated. The information is labeled o, □ and X in order to show the correspondence to three different image and/or sound files. As illustrated in FIGS. 2A, 2B(1) and 2B(2), the DOS information includes Bios Parameter Block (BPB) information, sometimes referred to as drive parameters or a parameter table, File Allocation Table (FAT) information, and Directory (DIR) information. The size of the BPB, FAT, and DIR information is as follows:

$$BPB = FAT < DIR \quad (1)$$

In each of FIGS. 2A, 2B(1), and 2B(2), all information which is illustrated is stored in the memory card 6 whereas the hatched regions designate the information which is stored in the data memory unit 8.

FIG. 2A illustrates MS-DOS information for the o image being edited. A feature of the invention is that DIR information is read from the memory card 6 and loaded into the data memory unit 8 only one portion at a time. As illustrated in FIG. 2A, all BPB and FAT information is read and loaded into the data memory unit 8. However, only a first portion of the DIR information (the DIR information for the o file) is read. Therefore, the DOS information relating to the o file can be edited without loading or reading the DIR information for the □ or X files.

FIGS. 2B(1) and 2B(2) illustrate the process of editing DOS information for the □ image. First, all BPB and DIR information is read along with the DIR information for the o information, as illustrated in FIG. 2B(1). However, there is no interest in editing the o image DOS information so subsequently, the DIR information for the □ image is loaded in the data memory unit 8 in place of the o DIR information so that all DOS information for the □ image can be edited, as illustrated in FIG. 2B(2).

The process of the invention will now be explained using the flowchart of FIG. 3. After starting, all BPB information for the o, □, and X images (files) is read from the memory card 6 and stored in the data memory unit 8 in step S1. Next, FAT information for the o, □, and X images (files) is read from the memory card and stored in the data memory unit 8 in step S2. In step S3, only a first part of DIR information which is, for example, DIR information for the o image is read from the memory card 6 and stored in the data memory unit 8.

In steps S4–S7, MS-DOS information is edited. Editing MS-DOS information means to edit FAT and DIR information. First, step S4 edits the File Allocation Table (FAT) information for the specific image which is having the DOS information edited. As the preferred embodiment loads all FAT information into the data memory unit 8, no matter for which image the FAT is being edited, the FAT information will exist in the data memory unit 8. Next, step S5 determines if the DIR information which is to be edited has been loaded into the data memory unit 8. If the appropriate DIR information has not been loaded into the data memory unit 8, step S6 loads a next section of DIR information from the memory card 6 to the data memory unit 8 and flow returns to step S5. When step S5 determines that the DIR information to be edited is loaded into the data memory unit, flow proceeds to step S7. Step S7 then edits the DIR information of the desired image which has been loaded into the data memory unit 8.

Step S8 then writes the BPB information used for all images into the memory card. However, if the BPB information has not been changed, it may not necessary to write the BPB information back into the memory card as it is already stored in the memory card. Step S9 then writes the FAT information for all images back into the memory card 6. Step S10 writes the portion of the edited DIR information which is currently stored in the data memory unit 8 back into the memory card 6 and the process of FIG. 3 then ends.

Next, the functions performed by steps S4–S10 will be explained using the two examples illustrated in FIGS. 2A–2B(2).

First, editing of the MS-DOS information for the o image (file) is described for the example illustrated in FIG. 2A. In step S4, the FAT information for the o image (file) is edited. Step S5 then determines whether the part of the DIR information which has been loaded into the data memory unit 8 is the DIR information to be edited. In this case, the first DIR information loaded into the data memory unit in step S3 is for the o image which is to be edited so flow proceeds to step S7 where the o directory information is edited.

As a second example, the editing of MS-DOS information for the □ image (file) is described using FIGS. 2B(1) and 2B(2). In step S4, the FAT information for the □ image (file) is described using FIGS. 2B(1) and 2B(2). In step S5, it is initially determined that the o DIR information is loaded into the data memory unit 8 as illustrated in FIG. 2B(1) but it is desired to edit the □ image DIR information. Accordingly, flow proceeds to step S6 which erases the o DIR image information and loads the next DIR information which is the desired □ DIR information, as illustrated in FIG. 2B(2). Step S5 then determines that the desired □ DIR information is loaded into the data memory unit 8 and the desired □ DIR information is then edited by step S7.

In both of the above examples, step S8 writes the BPB information for the o,□, and X images stored in the data memory unit 8 to the memory card 6. The FAT information for the o, □, and X images stored in the data memory unit 8 is read out from the data memory unit and written into the memory card 6 in step S9. In step S10, the DIR information for the o image (FIG. 2A), or the DIR information for the □ image (FIGS. 2B(1) and 2B(2)) stored in the data memory unit 8 is read out and written into the memory card 6. Accordingly, all necessary information is now recorded in the memory card 6 in the MS-DOS format and the process of the invention ends.

Obviously, numerous modifications and variations of the present invention are possible in light of the above teachings. It is therefore to be understood that within the scope of the appended claims, the present invention may be practiced otherwise than as specifically described herein. For example, as an alternative to or supplemental to the hardware described herein, the present invention can be implemented using the hardware disclosed in U.S. patent application Ser. No. 08/606,196 filed Feb. 21, 1996 entitled, "Digital Camera which Detects a connection to an External Device," which is incorporated herein by reference. Further, the invention has been described using examples of loading directory information of only one image or file at a time. However, the invention can also be implemented to load directory information of a plurality of images or files into the data memory unit 6 at a time. However, this embodiment as with the described examples, loads only a portion of the DIR information from the memory card 6 to the data memory unit 8.

What is claimed as new and is desired to be secured by Letters Patent of the United States is:

1. A digital camera, comprising:

an image photographing unit for receiving images and converting the images into analog signals;

a converting unit for converting the analog signals into digital signals representing the images;

a first memory for storing the digital signals representing the images and Disk Operating System (DOS) information corresponding to the images and having a first storage capacity of the DOS information;

an interface for controlling transferring of data into and out of the first memory;

a controlling unit for controlling operation of the digital camera; and a second memory for storing only a portion of the DOS information stored in the first memory and having a second storage capacity for the DOS information which is less than the first storage capacity.

2. A digital cameral according to claim 1, wherein:

the first memory stores file allocation table (FAT) information of the images stored in the first memory and directory information of the images; and the interface includes means for transferring the FAT information and only a portion of the directory information from the first memory to the second memory.

3. A digital camera according to claim 2, further comprising:

means for determining if desired directory information has been transferred to the second memory by the means for transferring within the interface;

means for editing the FAT information;

means for transferring additional directory information from the first memory to the second memory and writing over the directory information which was previously stored in the second memory; and means for editing the directory information stored in the second memory, wherein the interface further includes means for transferring the FAT information which has been edited and the directory information which has been edited from the second memory to the first memory.

4. A digital camera according to claim 1, further comprising:

a data processing unit for compressing and encoding the digital signals representing the images generated by the converting unit and transferring the digital signals which have been compressed and encoded to the first memory through the interface.

5. A method for processing digital signals representing images, comprising the steps of:

storing directory information and file allocation table (FAT) information of image in a first memory connected to a digital camera;

transferring the FAT information and a first portion of the directory information to a second memory in the digital camera;

determining if desired directory information has been transferred to the second memory;

transferring a second portion of the directory information from the first memory to the second memory when the step of determining determines the desired directory information has not been transferred to the second memory;

editing the directory information which is stored in the second memory; and transferring the directory information which has been edited to the first memory.

6. A method according to claim 5, further comprising the step of:

capturing the images using a light sensitive device, wherein the storing step include writing the images which have been captured, the directory information, and the FAT information into the first memory.

\* \* \* \* \*